United States Patent
Price

(10) Patent No.: US 7,598,299 B2
(45) Date of Patent: Oct. 6, 2009

(54) ANTI-FOULING COMPOSITIONS COMPRISING A POLYMER WITH SALT GROUPS

(75) Inventor: Clayton Price, North Shields (GB)

(73) Assignee: Akzo Nobel Coatings International B.V., Arnhem (NL)

(*) Notice: Subject to any disclaimer, the term of this patent is extended or adjusted under 35 U.S.C. 154(b) by 314 days.

(21) Appl. No.: 10/585,925

(22) PCT Filed: Jan. 11, 2005

(86) PCT No.: PCT/EP2005/000224

§ 371 (c)(1),
(2), (4) Date: Aug. 3, 2006

(87) PCT Pub. No.: WO2005/075581

PCT Pub. Date: Aug. 18, 2005

(65) Prior Publication Data

US 2007/0082972 A1    Apr. 12, 2007

Related U.S. Application Data

(60) Provisional application No. 60/543,330, filed on Feb. 11, 2004.

(30) Foreign Application Priority Data

Feb. 3, 2004    (EP)    .................................. 04075342

(51) Int. Cl.
C09D 5/16    (2006.01)
C09K 21/14    (2006.01)
(52) U.S. Cl. ...................... 523/122; 523/177
(58) Field of Classification Search .................. 523/122, 523/177
See application file for complete search history.

(56) References Cited

U.S. PATENT DOCUMENTS 4,675,051 A    6/1987    Baxter
5,520,910 A *  5/1996    Hashimoto et al. ........ 424/78.31
6,248,806 B1 * 6/2001    Codolar et al. .............. 523/177
6,251,967 B1 * 6/2001    Perichaud et al. ........... 523/122

FOREIGN PATENT DOCUMENTS

| EP | 0 069 559 | 1/1983 |
| EP | 0 204 456 | 12/1986 |
| EP | 0 529 693 | 3/1993 |
| EP | 0 663 409 | 7/1995 |
| EP | 0 779 304 | 6/1997 |
| EP | 0 802 243 | 10/1997 |
| GB | 231070 | 3/1925 |
| GB | 1457590 | 12/1976 |
| GB | 2 273 934 | 7/1994 |
| WO | WO 91/09915 | 7/1991 |
| WO | WO 91/14743 | 10/1991 |
| WO | WO 01/18077 | 3/2001 |
| WO | WO 02/02698 | 1/2002 |
| WO | WO 2004/018533 | 3/2004 |

OTHER PUBLICATIONS

Patent Abstracts of Japan, 07-082511, Mar. 28, 1995.*
Patent Abstracts of Japan, 63-273609, Nov. 10, 1988.
Patent Abstracts of Japan, 02-120372, May 8, 1990.
Patent Abstracts of Japan, 09-286933, Nov. 4, 1997.
International Search Report dated May 12, 2005, Application No. PCT/EP2005/000224, filed Jan. 11, 2005; International Preliminary Report on Patentability; Written Opinion of the International Searching Authority.

* cited by examiner

*Primary Examiner*—Kriellion A Sanders
(74) *Attorney, Agent, or Firm*—Kenyon & Kenyon LLP

(57) ABSTRACT

The invention relates to the use of a polymer including salts of amine-functional groups and/or salts of phosphine-functional groups bound (pendant) to the backbone of the polymer, said salts including as counter-ion the anionic residue of an acid having an aliphatic, aromatic, or alkaryl hydrocarbon group comprising at least 5 carbon atoms in antifouling compositions. The invention further relates to antifouling compositions including such a polymer.

10 Claims, No Drawings

ANTI-FOULING COMPOSITIONS COMPRISING A POLYMER WITH SALT GROUPS

This invention relates to antifouling paint, especially for marine applications.

Man-made structures such as boat hulls, buoys, drilling platforms, oil production rigs, and pipes which are immersed in water are prone to fouling by aquatic organisms such as green and brown algae, barnacles, mussels, and the like. Such structures are commonly of metal, but may also comprise other structural materials such as concrete. This fouling is a nuisance on boat hulls, because it increases frictional resistance during movement through the water, the consequence being reduced speeds and increased fuel costs. It is a nuisance on static structures such as the legs of drilling platforms and oil production rigs, firstly because the resistance of thick layers of fouling to waves and currents can cause unpredictable and potentially dangerous stresses in the structure, and secondly because fouling makes it difficult to inspect the structure for defects such as stress cracking and corrosion. It is a nuisance in pipes such as cooling water intakes and outlets, because the effective cross-sectional area is reduced by fouling, with the consequence that flow rates are reduced.

It is known to use antifouling paint, for instance as a top coat on ships' hulls, to inhibit the settlement and growth of marine organisms such as barnacles and algae, generally by release of a biocide for the marine organisms.

Traditionally, antifouling paints have comprised a relatively inert binder with a biocidal pigment that is leached from the paint. Among the binders which have been used are vinyl resins and rosin. Vinyl resins are seawater-insoluble and paints based on them use a high pigment concentration so as to have contact between the pigment particles to ensure leaching. Rosin is a hard brittle resin that is very slightly soluble in seawater. Rosin-based antifouling paints have been referred to as soluble matrix or eroding paints. The biocidal pigment is very gradually leached out of the matrix of rosin binder in use, leaving a skeletal matrix of rosin, which is washed off the hull surface to allow leaching of the biocidal pigment from deep within the paint film.

Many successful antifouling paints in recent years have been "self-polishing copolymer" paints based on a polymeric binder to which biocidal tri-organotin moieties are chemically bound and from which the biocidal moieties are gradually hydrolysed by seawater. In such binder systems, the side groups of a linear polymer unit are split off in a first step by reaction with seawater, the polymer framework that remains becoming water-soluble or water-dispersible as a result. In a second step, the water-soluble or water-dispersible framework at the surface of the paint layer on the ship is washed out or eroded. Such paint systems are described for example in GB-A-1 457 590.

As the use of tri-organotin has been prohibited world-wide, there is a need for alternative antifouling substances that can be used in antifouling compositions. Self-polishing copolymer paints which release non-biocidal moieties are described in EP-A-69 559, EP-A-204 456, EP-A-529 693, EP-A-779 304, WO-A-91/14743, WO-A-91/09915, GB-A-231 070, and JP-A-9-286933.

U.S. Pat. No. 4,675,051 describes a marine antifouling paint which is gradually dissolved in seawater and which comprises a binder in the form of a resin produced by the reaction of rosin and an aliphatic polyamine containing at least one primary or secondary amine group. EP-A-802 243 describes a coating composition comprising a rosin compound, a polymer containing organosilyl ester groups, and an antifoulant.

WO-A-02/02698 describes an antifouling paint which is gradually dissolved in seawater. The paint comprises a binder and an ingredient having marine biocide properties. The binder comprises a rosin material and an auxiliary film-forming resin. The auxiliary film-forming resin comprises a non-hydrolysing, water-insoluble film-forming polymer and an acid-functional film-forming polymer the acid groups of which are blocked by quaternary ammonium groups or quaternary phosphonium groups. In a first step, the blocking groups are hydrolysed, dissociated or exchanged with seawater species, the polymer framework that remains becoming soluble or dispersible in seawater as a result. In a second step, the soluble or dispersible framework at the surface of the paint layer on the ship is washed out or eroded.

The structure of the quaternary ammonium groups or quaternary phosphonium groups that are used as blocking groups on the acid-functional polymer influences the rate at which the paint dissolves or erodes. Although longer-chain quaternary ammonium groups ensure a slow degradation of the paint, these groups are more toxic with increasing size. This toxicity is for instance used in the mildew-proofing coating composition described in JP-A-2-120372.

GB-A-2 273 934 describes a binder system that is an alternative to organotin-based antifouling systems. One of the hydrolysable polymeric binders described comprises halide-amine salt-comprising groups bound to a polymeric backbone. Such a polymeric binder is prepared by copolymerisation of halide-amine salt monomers that comprise a (meth)acrylamide functionality. These polymeric binders are partially soluble in seawater due to the halide-amine salt groups. However, as the whole binder is to some extent seawater-soluble from the start, the paint erodes relatively quickly.

JP-A-07 082511 describes another binder system that is an alternative to organotin-based antifouling systems. One of the hydrolysable polymeric binders described comprises phosphonium salt groups bound to a polymeric backbone. The counter-ion of the phosphonium ion is a small group, for instance a halogen ion, the residue of formic acid, acetic acid or oxalic acid, a sulphate ion, or a phosphoric acid ion. These polymeric binders are partially soluble in seawater due to the small phosphonium salt groups. However, as the whole binder is to some extent seawater-soluble from the start, the paint erodes relatively quickly.

Salt group-comprising binders as described above are alternatives for tin systems, but the erosion rate of those systems is relatively high. Consequently, there is a need for a salt group-comprising binder polymer which is relatively poorly soluble in seawater from the start, while the counter-ions are hydrolysable, separable or exchangeable with seawater species, the polymer framework that remains becoming soluble or dispersible in seawater as a result.

The present invention relates to the use of a polymer which provides a solution to the above-mentioned problems/disadvantages in antifouling compositions, to antifouling compositions comprising the polymer, and to the use of such antifouling compositions for the protection of man-made structures immersed in water such as boat hulls, buoys, drilling platforms, oil production rigs, and pipes.

The binder polymer used in the present invention is a polymer comprising one or more salts of amine-functional groups and/or one or more salts of phosphine-functional groups that are bound (pendant) to the backbone of the polymer, said salt comprising as counter-ion the anionic residue of an acid having an aliphatic, aromatic, or alkaryl hydrocarbon group comprising at least 5, preferably at least 6 carbon atoms. Said binder polymer comprises one or more salts of amine-functional groups and/or one or more salts of phosphine-functional groups bound to the backbone of the polymer consisting of or comprising a group of formula (I):

$$-\underset{\underset{}{|}}{\overset{R^1}{C}}-\overset{O}{\underset{}{\overset{\|}{C}}}-Y-R^2-\overset{(+)}{\underset{\underset{R^4}{\backslash}}{\overset{R^3}{\diagup}}}Z-H \quad X^{(-)}$$

wherein
  Y is O or NH, Z is N or P, $R^1$ is a hydrogen atom or a $C_1$-$C_4$ alkyl group, preferably hydrogen or a $C_1$-$C_2$ alkyl group.
  $R^2$ is a $C_2$-$C_{12}$ divalent hydrocarbon group, preferably a $C_2$-$C_8$ divalent hydrocarbon group, more preferably a $C_2$-$C_4$ divalent hydrocarbon group.
  $R^3$ and $R^4$ independently represent a hydrogen atom or an alkyl group, preferably a $C_1$-$C_6$ alkyl group, more preferably a methyl, or an optionally substituted phenyl group.
  X is the anionic residue of an acid having an aliphatic, aromatic, or alkaryl hydrocarbon group comprising at least 5, preferably at least 6 carbon atoms.

Hence, the polymer comprises a salt of a primary and/or secondary and/or tertiary amine and/or a salt of a primary and/or secondary and/or tertiary phosphine. Such polymers are described for example in JP 63-273609. This Japanese document describes the use of such polymers as coagulation treatment agents for waste water containing a large amount of organic materials.

A process for preparing a salt group-comprising polymer as used in the present invention may comprise the steps of:
  Reacting a long-chain acid with an amine- or phosphine-functional monomer of formula (II):

$$H_2C=\underset{\underset{}{|}}{\overset{R^1}{C}}-\overset{O}{\underset{}{\overset{\|}{C}}}-Y-R^2-\underset{\underset{R^4}{\backslash}}{\overset{R^3}{\diagup}}Z$$

wherein
    Y is O or NH, Z is N or P, $R^1$ is a hydrogen atom or a $C_1$-$C_4$ alkyl group, preferably hydrogen or a $C_1$-$C_2$ alkyl group.
    $R^2$ is a $C_2$-$C_{12}$ divalent hydrocarbon group, preferably a $C_2$-$C_8$ divalent hydrocarbon group, more preferably a $C_2$-$C_4$ divalent hydrocarbon group.
    $R^3$ and $R^4$ independently represent a hydrogen atom or a $C_1$-$C_6$ alkyl group, preferably methyl, or an optionally substituted phenyl group.
  This reaction results in a monomer comprising a salt of an amine-functional group and/or a salt of a phosphine-functional group, said salt comprising as counter-ion the anionic residue of an acid having an aliphatic, aromatic, or alkaryl hydrocarbon group comprising at least 5, preferably at least 6 carbon atoms (see formula (I) above). Quaternary ammonium or quaternary phosphonium groups are not formed by this reaction.
  Polymerisation of at least one type of salt-comprising monomer, which monomer comprises a salt of an amine-functional group and/or a salt of a phosphine-functional group according to formula (I) as defined above.

An acid having an aliphatic, aromatic, or alkaryl hydrocarbon group comprising 5 or more, preferably 6 or more carbon atoms can be used as long-chain acid in the first-mentioned process step. For example, the acid may be a carbonic acid, a sulphonic acid, or a sulphate acid. Preferably, the acid comprises 5 or more, more preferably 6 or more carbon atoms, even more preferably 8 or more carbon atoms. The acids can be branched. The acids may comprise cyclic groups. Suitable acids are, for example, palmitic acid, steric acid, ethyl hexanoic acid, rosin, and acid-functional rosinate derivatives. The acid preferably comprises up to 50 carbon atoms, more preferably up to 30 carbon atoms, even more preferably up to 20 carbon atoms, and most preferably 16 carbon atoms. Optionally, the acid is an acid-functional compound having marine biocidal properties, such as (9E)-4-(6,10-dimethylocta-9,11-dienyl) furan-2-carboxylic acid or p-(sulpho-oxy) cinnamic acid (zosteric acid).

The polymerisation of the salt-comprising monomer, or of a mixture of salt-comprising monomers, can be performed using a variety of co-monomers, optionally mixtures of co-monomers. For example, addition copolymerisation can be performed with an unsaturated monomer prepared by reacting an ester or amide of an alkyl, alkoxyalkyl, carbocyclic or heterocyclic alcohol or amine with an unsaturated carboxylic acid, such as methyl acrylate or methacrylate, butyl acrylate or methacrylate, isobutylacrylate or methacrylate, and isobornyl acrylate or methacrylate. Alternatively, the unsaturated co-monomer can be a vinylic compound, for example styrene, vinyl pyrrolidone or vinyl acetate.

The polymerisation of the salt-comprising monomer can be performed using a long-chain, acid-capped quaternary ammonium-functional monomer and/or a long-chain, acid-capped quaternary phosphonium-functional monomer. Such monomers and the polymerisation thereof are described in WO 2004/018533. The quaternary ammonium-functional and/or quaternary phosphonium-functional group of such monomer is 'long-chain, acid-capped', i.e. it is neutralised by a counter ion that consists of the anionic residue of an acid having an aliphatic, aromatic, or alkaryl hydrocarbon group comprising 6 or more carbon atoms. The resulting polymer then comprises a salt of a primary and/or secondary and/or tertiary amine and/or a salt of a primary and/or secondary and/or tertiary phosphine and it is quaternary ammonium- and/or quaternary phosphonium-functional. Such a system can be referred to as a mixed system.

The polymerisation of salt-comprising monomers preferably is performed using at least 5 mole % salt-comprising monomers, more preferably at least 10 mole %. The polymerisation is preferably performed using less than 40 mole % salt-comprising monomers, more preferably less than 30 mole %. In case the polymerisation is performed using salt-comprising monomers as well as quaternary functional monomers, the total amount of salt-comprising monomers plus quaternary functional monomers preferably is at least 5 mole %, more preferably at least 10 mole %, and preferably less than 40 mole %, more preferably less than 30 mole %.

The present invention relates to the use in antifouling coating compositions of a polymer comprising one or more salts of amine-functional groups and/or one or more salts of phosphine-functional groups bound (pendant) to the backbone of the polymer, said salt comprising as counter-ion the anionic residue of an acid having an aliphatic, aromatic, or alkaryl hydrocarbon group comprising at least 5, preferably at least 6 carbon atoms. Said binder polymer comprises one or more salts of amine-functional groups and/or one or more salts of phosphine-functional groups bound to the backbone of the polymer consisting of or comprising a group of formula (I) as defined above.

Preferably, a polymer comprising one or more salts of amine-functional groups and/or one or more salts of phosphine-functional groups bound (pendant) to the backbone of the polymer is used that has been built of at least 5 mole % salt-comprising monomers, calculated on the total amount of monomers of which the polymer has been built. More preferably, the polymer comprises at least 10 mole % salt-comprising monomer building blocks. Preferably a polymer is used that comprises less than 40 mole % salt-comprising monomer building blocks, more preferably less than 30 mole %.

Also preferred is the use of a polymer comprising one or more salt-comprising monomer building blocks and one or more quaternary-functional monomer building blocks of which the total amount of salt-comprising monomer building blocks plus quaternary functional monomer building blocks is at least 5 mole %, more preferably at least 10 mole %, and preferably less than 40 mole %, more preferably less than 30 mole %

Also preferred is the use of a mixture of polymers comprising one or more salts of amine-functional groups and/or one or more salts of phosphine-functional groups and optionally polymers comprising one or more quaternary ammonium- and/or quaternary phosphonium-functional groups bound (pendant) to the backbones of the polymers. Said mixture preferably comprises at least 5 mole % salt-comprising plus (the optionally present) quaternary functional monomer building blocks, calculated on the total amount of monomers of which the polymers in the mixture have been built. More preferably the mixture comprises at least 10 mole % salt-comprising plus quaternary functional monomer building blocks. Preferably a mixture of polymers is used that comprises less than 40 mole % salt-comprising plus quaternary functional monomer building blocks, more preferably less than 30 mole %.

The present invention further relates to antifouling coating compositions comprising a polymer comprising salts of amine-functional groups and/or salts of phosphine-functional groups bound (pendant) to the backbone of the polymer, said salt comprising as counter-ion the anionic residue of an acid having an aliphatic, aromatic, or alkaryl hydrocarbon group comprising at least 5, preferably at least 6 carbon atoms. Said binder polymer comprises one or more salts of amine-functional groups and/or one or more salts of phosphine-functional groups bound to the backbone of the polymer consisting of or comprising a group of formula (I) as defined above.

Preferably, the coating composition comprises a polymer comprising one or more salts of amine-functional groups and/or one or more salts of phosphine-functional groups bound (pendant) to the backbone of the polymer, that comprises at least 5 mole % salt-comprising monomer building blocks, more preferably at least 10 mole %. Preferably, the coating composition comprises a polymer that comprises less than 40 mole % salt-comprising monomer building blocks, more preferably less than 30 mole %.

Also preferred is a coating composition comprising a polymer comprising one or more salt-comprising monomer building blocks and one or more quaternary-functional monomer building blocks of which the total amount of salt-comprising monomer building blocks plus quaternary functional monomer building blocks is at least 5 mole %, more preferably at least 10 mole %, and preferably less than 40 mole %, more preferably less than 30 mole %

Also preferred is a coating composition comprising a mixture of polymers comprising one or more salts of amine-functional groups and/or one or more salts of phosphine-functional groups and optionally polymers comprising one or more quaternary ammonium- and/or quaternary phosphonium-functional groups bound (pendant) to the backbone of the polymer, said mixture comprising at least 5 mole % salt-comprising plus (the optionally present) quaternary functional monomer building blocks, more preferably at least 10 mole %.

Preferably, the coating composition comprises a mixture of polymers that comprises less than 40 mole % salt-comprising plus quaternary functional monomer building blocks, more preferably less than 30 mole %.

In a preferred embodiment, the counter-ions of the salts in the polymer that comprises one or more salts of amine-functional groups and/or one or more salts of phosphine-functional groups are, on average, of low toxicity or even non-biocidal. In that case, an antifouling coating composition according to the present invention should comprise a separate ingredient having marine biocidal properties.

In another preferred embodiment, the salts in the polymer that comprises one or more salts of amine-functional groups and/or one or more salts of phosphine-functional groups comprise as counter ion an ingredient having marine biocidal properties. In that case, an antifouling coating composition according to the present invention may comprise a separate ingredient having marine biocidal properties as co-biocide. An advantage of the incorporation of a biocide into the salt groups of the polymer is that the release rate of the built-in biocide depends on the ion exchange rate, which is more controllable than a release rate depending on diffusion rates. The acid-functional biocide used as counter-ion can be a natural or a synthesised compound and may be derived from natural products. For example, the acid-functional biocide used as counter-ion can be a material derived from a marine organism. Preferably, the biocide is readily degradable in the marine environment.

The polymer framework, i.e. the binder, that dissolves in seawater or becomes dispersed in seawater (after or during hydrolysation, separation or exchange with seawater species of the counter-ions) preferably is of low toxicity, most preferably non-biocidal.

The rate at which a cured coating prepared from an antifouling coating composition according to the current invention dissolves or erodes in seawater can be adjusted by the structure of the long-chain acid residue counter-ion groups, substantially without problems related to the toxicity of the released groups. A long-chain acid residue counter-ion group may for instance comprise a long chain, and/or it may be branched, and/or it may comprise cyclic groups. By changing the hydrophobicity of the long-chain acid residue counter-ion groups the rate at which the coating dissolves or erodes in seawater can be adjusted. Also the actual amount of the salt monomers used to prepare the polymer comprising one or more salts of amine-functional groups and/or one or more salts of phosphine-functional groups can be used to adjust the rate at which the coating dissolves or erodes in seawater. Preferably, the counter-ion groups comprise anionic residues of one or more acids having an aliphatic hydrocarbon group comprising 5 to 50 carbon atoms, more preferably 6 to 50 carbon atoms, even more preferably 6 to 20 carbon atoms. The counter-ion can, for example, be comprised of the anionic residue of rosin or other rosinate derived materials.

According to another embodiment of the invention, the antifouling composition according to the current invention comprises a rosin material as binder material in addition to the polymer comprising salts of amine-functional groups and/or salts of phosphine-functional groups bound (pendant) to the backbone of the polymer, said salt comprising as counter-ion the anionic residue of an acid having an aliphatic, aromatic, or alkaryl hydrocarbon group comprising at least 5, preferably at least 6 carbon atoms. Said salt group-comprising binder polymer comprises one or more salts of amine-functional groups and/or one or more salts of phosphine-functional groups bound to the backbone of the polymer consisting of or comprising a group of formula (I) as defined above. Rosin is not a very good film former, and it is known to add other film-forming resins to rosin-based antifouling paints. Consequently, an antifouling coating composition according to the present invention comprising a rosin material as binder material (optionally, rosin may also be present as counter-ion in the polymer comprising salts of amine-functional groups and/or salts of phosphine-functional groups) preferably will additionally comprise a non-hydrolysing, water-insoluble film-forming polymer. The ratio of the rosin binder material to the polymer comprising salts of amine-functional groups and/or salts of phosphine-functional groups and optionally one or more other film-forming resins influences the strength of the paint film and/or the reliable eroding of the rosin-based paint matrix.

According to a preferred embodiment of the invention, the antifouling paint has a binder comprising a blend of a rosin material and an auxiliary film-forming resin in a weight ratio of 20:80 to 95:5, the auxiliary film-forming resin comprising 20-100% by weight of a film-forming polymer (A), which is the salt group-comprising polymer having salts of amine-functional groups and/or salts of phosphine-functional groups bound (pendant) to the backbone of the polymer, said salts comprising as counter-ion the anionic residue of an acid having an aliphatic, aromatic, or alkaryl hydrocarbon group comprising at least 5, preferably at least 6 carbon atoms, and 80-20% of a non-hydrolysing, water-insoluble film-forming polymer (B).

The rosin material which can be added as binder material to a composition comprising the polymer comprising salts of amine-functional groups and/or salts of phosphine-functional groups preferably is rosin, more particularly wood rosin or alternatively tall rosin or gum rosin. The main chemical constituent of rosin is abietic acid. The rosin can be any of the grades sold commercially, preferably that sold as WW (water white) rosin. The rosin material can alternatively be a rosin derivative, for example a maleinised or fumarised rosin, hydrogenated rosin, formylated rosin or polymerised rosin, or a rosin metal salt such as calcium, magnesium, copper or zinc rosinate.

The non-hydrolysing, water-insoluble film-forming polymer (B) can for example be a vinyl ether polymer, such as a poly(vinyl alkyl ether) or a copolymer of a vinyl alkyl ether with vinyl acetate or vinyl chloride, an acrylate ester polymer such as a homopolymer or copolymer of one or more alkyl acrylates or methacrylates which preferably contain 1 to 6 carbon atoms in the alkyl group and may contain a co-monomer such as acrylonitrile or styrene, or a vinyl acetate polymer such as polyvinyl acetate or a vinyl acetate vinyl chloride copolymer. Polymer (B) can alternatively be a polyamine, particularly a polyamide having a plasticising effect such as a polyamide of a fatty acid dimer or the polyamide sold under the Trademark "Santiciser".

We have found that the paints of the invention have the optimum combination of film-forming and eroding properties when the non-hydrolysing, water-insoluble film-forming polymer (B) is present in the composition. Most preferably, the weight ratio of rosin to total auxiliary film-forming resin is from 25:75, 50:50 or 55:45 up to 80:20. The hydrolysing or dissociating film-forming polymer (A) preferably forms at least 30, most preferably at least 50, up to 80 or 90% by weight of the auxiliary film-forming resin, the non-hydrolysing water-insoluble polymer (B) being the remainder.

The rosin and the polymers forming the auxiliary film-forming resin can be mixed in a common solvent which forms at least part of the paint solvent, for example, an aromatic hydrocarbon such as xylene, toluene or trimethyl-benzene, an alcohol such as n-butanol, an ether alcohol such as butoxy-ethanol or methoxypropanol, an ester such as butyl acetate or isoamyl acetate, an ether-ester such as ethoxyethyl acetate or methoxypropyl acetate, a ketone such as methyl isobutyl ketone or methyl isoamyl ketone, an aliphatic hydrocarbon such as white spirit, or a mixture of two or more of these solvents.

An antifouling paint according to the present invention, either with or without rosin, can include a non-polymeric plasticiser. Such a plasticiser can for example be present at up to 50% by weight based on the total binder polymer, most preferably at least 10% and up to 35% by weight based on the binder polymer. Examples of such plasticisers are phthalate esters such as dibutyl phthalate, butyl benzyl phthalate or dioctyl phthalate, phosphate triesters such as tricresyl or tris (isopropyl)phenyl phosphate, or chlorinated paraffins.

An ingredient having marine biocidal properties usually is a biocide for aquatic organisms or a pigment, or a mixture thereof. This biocide and/or pigment can be mixed with the binder using conventional paint-blending techniques. When the ingredient having marine biocidal properties is a pigment, it can be all or part of the pigment of the paint. The coating composition preferably has a pigment volume concentration of, for example, 15 to 55%.

When the ingredient having marine biocidal properties is a pigment, the pigment can comprise a metalliferous pigment, for example a metalliferous pigment having a solubility in seawater of from 0.5 to 10 parts per million by weight. Examples of such pigments which also behave as aquatic biocides include copper or zinc compounds, such as cuprous oxide, cuprous thiocyanate, cuprous sulphate, zinc ethylene bis(dithiocarbamate), zinc dimethyl dithiocarbamate, zinc pyrithione, copper pyrithione, zinc diethyl dithiocarbamate, copper rosinate or cuprous ethylene bis(dithiocarbamate). Other sparingly soluble pigments having a solubility in seawater of 0.5 to 10 parts per million include barium sulphate, calcium sulphate, dolomite, and zinc oxide. Mixtures of sparingly soluble pigments can be used: for example, cuprous oxide, cuprous thiocyanate or zinc ethylene bis(dithiocarbamate), which are highly effective biocidal pigments, can be mixed with zinc oxide, which is not effective as a biocide but dissolves slightly more rapidly in seawater. Copper metal can be present as an aquatic biocide, for example in the flake or powder form.

The antifouling coating composition can contain a non-metalliferous biocide for marine organisms, i.e. an ingredient having marine biocidal properties that is a biocide but not a pigment. Examples of such compounds are tetramethyl thiuram disulphide, methylene bis(thiocyanate), captan, pyridine triphenylboron, a substituted isothiazolone such as 4,5-dichloro-2-n-octyl-4-isothiazolin-3-one, 2-methylthio-4-t.butylamino-6-cyclopropylamino-s-triazine, N-3,4-dichlorophenyl-N',N'-dimethyl-urea ("Diuron"), 2-(thiocyanomethylthio)benzothiazole, 2,4,5,6-tetrachloro-isophthalonitrile, dichlorofluanide, tolylfluanide, 2-(p-chlorophenyl)-3-cyano-4-bromo-5-trifluoro-methyl pyrrole, 3-benzo(b)thien-2-yl-5,6-dihydro-1,4,2-oxathiazine 4-oxide, 3-butyl-5-(dibromomethylidene)-2(5H)-furanone, and 2,3,5,6-tetrachloro-4-(methyl-sulphonyl)pyridine, 5-methyl-2-(1-methylethyl)-cyclohexanol (L-menthol), mentholpropyleneglycol-carbonate. Such a non-metalliferous biocide can be used as the only biocide of the coating in a copper-free, or even metal-free or pigment-free antifouling coating.

Optionally, the antifouling composition comprises one or more acid-functional biocides, for example (9E)-4-(6,10-dimethylocta-9,11-dienyl) furan-2-carboxylic acid and p-(sulpho-oxy) cinnamic acid (zosteric acid). Such a (mixture of) non-metalliferous acid-functional biocide(s) can be used as the only biocide of the coating in a copper-free, or even metal-free or pigment-free antifouling coating.

Alternatively or additionally, an acid-functional biocide can be incorporated into the polymer comprising salts of amine-functional groups and/or salts of phosphine-functional groups, i.e., one or more of the counter-ions in the polymer can be the anionic residue of an acid-functional biocide. In cases where enough acid-functional biocide is incorporated into the polymer comprising salts of amine-functional groups and/or salts of phosphine-functional groups, a separate ingredient having biocidal properties is not required.

In addition to an ingredient having marine biocidal properties, which usually is a biocide for aquatic organisms or a pigment or a mixture thereof, or a biocide incorporated into the polymer, the coating composition can contain (other) pigments. For instance, pigments which are not reactive with seawater and may be highly insoluble in seawater (solubility below 0.5 part per million by weight), such as titanium dioxide or ferric oxide or an organic pigment such as phthalocyanine or azo pigment. Such highly insoluble pigments are preferably used at less than 60% by weight of the total pigment component of the paint, most preferably less than 40%.

The coating composition can additionally contain other additives, for instance conventional thickeners, particularly thixotropes such as silica or bentonite and/or stabilisers, for example zeolites or aliphatic or aromatic amines such as dehydroabietylamine.

The invention will be elucidated with reference to the following examples. These are intended to illustrate the invention but are not to be construed as limiting in any manner the scope thereof.

EXAMPLE 1

Palmitate Capped Monomer Preparation

To obtain N-[3-(dimethylammonium)propyl]methacrylamide palmitate salt, N-[3-(dimethylamino)propyl]methacrylamide was reacted with palmitic acid in the following way.

N-[3-(dimethylamino)propyl]methacrylamide (20 g, 0.1175 moles) was dissolved in methanol (400 mL) and placed in a 1 L three-necked round bottom flask. To this stirring solution solid palmitic acid (30.13 g, 0.1175 moles) was added, using a powder funnel and under a constant $N_2$ purge. The reaction mixture was stirred at room temperature overnight.

The colourless liquid was filtered to remove any residual particulate and the solvent was removed under reduced pressure. The resultant viscous liquid was analysed by $^1H$ nmr and used without further purification.

The above-described experiment was performed under the conditions routinely employed for this reaction. Variations on these reaction conditions are possible. For example, alternative solvents such as ethanol, propanol, isopropanol, butanol, or blends of these with xylene can be employed to yield a monomer solution which can be carried forward directly (without isolation) to the polymerisation step. In addition, the reaction can be carried out at elevated temperatures for shorter time periods.

EXAMPLE 2

Abietic Acid (Rosin) Capped Monomer Preparation

To obtain N-[3-(Dimethylammonium)propyl]methacrylamide rosinate salt, N-[3-(Dimethylamino)propyl]methacrylamide was reacted with abietic acid in the following way.

N-[3-(Dimethylamino)propyl]methacrylamide (20 g, 0.1175 moles) was dissolved in methanol (400 mL) and placed in a 1 L three-necked round bottom flask. To this stirring solution solid abietic acid (35.54 g, 0.1175 moles) was added, using a powder funnel and under a constant $N_2$ purge. The reaction mixture was stirred at room temperature overnight.

The straw coloured liquid was filtered to remove any residual particulate and the solvent was removed under reduced pressure. The resultant dark, viscous liquid was analysed by $^1H$ nmr and used without further purification.

EXAMPLE 3

Polymer Preparation

The N-[3-(dimethylammonium)propyl]methacrylamide palmitate salt prepared in Example 1 was polymerised with isobornylmethacrylate (iBoMA) (20:80) such that a 50% solids polymer solution was obtained.

A feed solution was prepared comprising N-[3-(dimethylammonium)-propyl]methacrylamide palmitate (50.14 g, 0.1175 moles) in (3:1) xylene:butanol (50 g), iBoMA (104.50 g, 0.47 moles), and 2,2'-azobis-(2-methylbutyronitrile) AMBN initiator (1.13 g, 0.0059 moles, 1 mole %). This feed solution was added dropwise over 3½h, with mechanical stirring and under an atmosphere of $N_2$, to a reaction vessel containing (3:1) xylene:butanol (156 g) at 85° C. After the monomer addition was complete, the temperature was raised to 95° C. and a boost amount of AMBN (0.56 g, 0.0029 moles) was added. The reaction was maintained at this elevated temperature for 1 h. The polymer solution was transferred to a storage vessel on cooling.

The above-described experiment was performed under the conditions routinely employed for this reaction, although variations on these conditions are possible. Other solvents or solvent blends comprised of common paint solvents can be used as alternatives. Other co-monomers are, for example, methyl (meth)acrylate, butyl (meth)acrylate, isobutyl (meth)acrylate, isobornyl acrylate, styrene, and other vinylic monomers. Also the ratio of monomers can be changed. Preferably, the amine-acid salt monomer will be present in an amount of 5 to 40 mole %, more preferably 10 to 30 mole %. The viscosities of the polymer solutions are such that materials can be formulated at percentage solids within the range 45-65%. In addition, alternative initiators such as α,α'-azoisobutyronitrile (AIBN) can be used.

EXAMPLE 4

Coating Composition

The following materials were mixed in the stated % by weight using a high-speed disperser to form copper-containing antifouling paints according to the invention.

| Name | Description | Dry Film Vol. | Wt % |
|---|---|---|---|
| Palmitate-capped Resin | Resin solution | 21.61 | 16.37 |
| Hydroquinone | Inhibitor | 0.24 | 0.10 |
| Tixogel MP ® | Organoclay gellant | 2.42 | 1.36 |
| Silica-Wacker HDK-N20 ® | Thixotrope | 1.47 | 1.01 |
| Xylene | Solvent | — | 3.05 |
| Hansa-Scarlet RN-C ® | Pigment | 5.10 | 2.27 |
| Copper Omadine ® | Biocide | 6.77 | 3.89 |
| Zinc Oxide | Pigment | 6.76 | 11.63 |
| Cuprous Oxide | Biocide | 20.25 | 36.73 |
| Lutonal A25 ® (polyvinyl ethyl ether) | Plasticiser | 11.93 | 3.54 |
| Methyl iso-amyl ketone | Solvent | — | 2.27 |

EXAMPLE 5

Copper-Free Coating Composition

The following materials were mixed in the stated % by weight using a high-speed disperser to form copper-free antifouling paints according to the invention.

| Name | Description | Dry Film Vol | Wt % |
|---|---|---|---|
| Palmitate-capped Resin | Resin solution | 43.24 | 36.29 |
| Xylene | Solvent | — | 5.09 |
| Bentone SD1 ® | Organoclay gellant | 1.01 | 0.52 |
| Silica-Wacker HDK-N20 ® | Thixotrope | 0.68 | 0.52 |
| Anti-Terra 203 ® | Dispersant | 0.76 | 0.46 |
| Irgarol 1051 ® | Biocide | 12.94 | 4.93 |
| Zinc Oxide | Pigment | 21.45 | 40.88 |
| Zinc Omadine ® | Biocide | 6.33 | 3.91 |
| Lutonal A25 ® (polyvinyl ethyl ether) | Plasticiser | 10.81 | 3.56 |
| Titanium dioxide (Rutile) | Pigment | 2.77 | 3.84 |

EXAMPLE 6

Copper Free Coating Composition

The following materials were mixed in the stated % by weight using a high-speed disperser to form copper-free antifouling paints according to the invention.

| Name | Description | Dry Film Vol | Wt % |
|---|---|---|---|
| Rosinate-capped Resin | Resin solution | 43.24 | 36.64 |
| Xylene | Solvent | — | 19.92 |
| Bentone SD1 ® | Organoclay gellant | 1.01 | 0.59 |
| Silica-Wacker HDK-N20 ® | Thixotrope | 0.68 | 0.59 |
| Anti-Terra 203 ® | Dispersant | 0.76 | 0.54 |
| Boracide P ® | Biocide | 20.36 | 9.32 |
| Zinc Oxide | Pigment | 12.22 | 26.97 |
| Zinc Omadine ® | Biocide | 8.14 | 5.82 |
| Lutonal A25 ® (polyvinyl ethyl ether) | Plasticiser | 10.81 | 4.12 |
| Titanium dioxide (Rutile) | Pigment | 2.77 | 4.45 |

EXAMPLE 7

Copper-Free Coating Composition

The following materials were mixed in the stated % by weight using a high-speed disperser to form copper-free antifouling paints according to the invention.

| Name | Description | Dry Film Vol | Wt % |
|---|---|---|---|
| Rosinate-capped Resin | Resin solution | 39.02 | 31.88 |
| Xylene | Solvent | — | 13.19 |
| Bentone SD1 ® | Organoclay gellant | 0.91 | 0.57 |
| Silica-Wacker HDK-N20 ® | Thixotrope | 0.61 | 0.57 |
| Gum Rosin | Rosin | 9.76 | 6.75 |
| Anti-Terra 203 ® | Dispersant | 0.69 | 0.51 |
| Econea 028 ® | Biocide | 22.05 | 15.90 |
| Zinc Oxide | Pigment | 7.35 | 17.01 |
| Zinc Omadine ® | Biocide | 7.35 | 5.51 |
| Lutonal A25 ® (polyvinyl ethyl ether) | Plasticiser | 9.76 | 3.89 |
| Titanium dioxide (Rutile) | Pigment | 2.50 | 4.21 |

EXAMPLE 8

Zinc- and Copper-Free Coating Composition

The following materials were mixed in the stated % by weight using a high-speed disperser to form zinc- and copper-free antifouling paints according to the invention.

| Name | Description | Dry Film Vol | Wt % |
|---|---|---|---|
| Palmitate-capped Resin | Resin solution | 34.61 | 28.87 |
| Xylene | Solvent | — | 4.63 |
| Tixogel MP ® | Organoclay gellant | 1.43 | 1.01 |
| Silica-Wacker HDK-N20 ® | Thixotrope | 0.35 | 0.30 |
| Sea-Nine 211 ® | Biocide | 6.89 | 9.94 |
| Preventol A5 ® | Biocide | 8.69 | 5.12 |
| Iron Oxide (Bayferrox Red 130BM ®) | Pigment | 3.32 | 6.53 |
| Lutonal A25 ® (polyvinyl ethyl ether) | Plasticiser | 8.65 | 3.23 |
| Dolomite Microdol H extra ® | Filler | 36.06 | 40.36 |

The invention claimed is:
1. An antifouling coating composition comprising:
a rosin as binder material, and
a salt group-comprising polymer obtained by a process comprising the steps of:
reacting an acid having an aliphatic, aromatic, or alkaryl hydrocarbon group comprising 5 or more carbon atoms with an amine- or phosphine-functional monomer of formula:

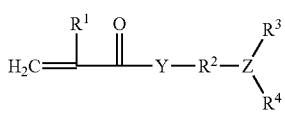

wherein

Y is O or NH,

Z is N or P, $R^1$ is a hydrogen atom or a $C_1$-$C_4$ alkyl group, $R^2$ is a $C_2$-$C_{12}$ divalent hydrocarbon group, $R^3$ and $R^4$ independently represent a hydrogen atom or a $C_1$-$C_6$ alkyl group or an optionally substituted phenyl group, to form a monomer comprising a salt of an amine-functional group and/or a salt of a phosphine-functional group, said salt comprising as counter-ion the anionic residue of an acid having aliphatic, aromatic, or alkaryl hydrocarbon group comprising at least 5 carbon atoms; and polymerizing at least one type of said salt-comprising monomer.

2. The coating composition according to claim 1, wherein the anionic residue comprises 5 to 50 carbon atoms.

3. The coating composition according to claim 1, wherein the polymer, or a mixture of the polymer with other polymers present in the composition that comprise one or more salts of amine-functional groups and/or one or more salts of phosphine-functional groups and/or one or more quaternary ammonium and/or one or more quaternary phosphonium-functional groups bound to the backbone of the polymer, comprises a total amount of salt-comprising plus quaternary functional monomer building blocks of 5 to 40 mole %, calculated on the total amount of monomers of which the polymer or the polymer mixture has been built.

4. The coating composition according to claim 1, wherein the coating composition has a binder comprising a blend of a rosin material and an auxiliary film-forming resin in a weight ratio of 20:80 to 95:5, the auxiliary film-forming resin comprising 20-100% by weight of a film-forming polymer (A), which is the salt group-comprising polymer, and 80-20% of a non-hydrolysing, water-insoluble film-forming polymer (B).

5. The coating composition according to claim 4, wherein the binder comprises a blend of the rosin material and the auxiliary film-forming resin in a weight ratio of 55:45 to 80:20.

6. The coating composition according to claim 4, wherein the auxiliary film-forming resin comprises 30-90% by weight of the film-forming polymer (A) capable of hydrolysing or dissociating to a polymer soluble in sea water and 70-10% by weight of the non-hydrolysing, water-insoluble film-forming polymer (B).

7. The coating composition according to claim 3, wherein the non-hydrolysing, water-insoluble film-forming polymer (B) is an acrylate ester polymer or a vinyl ether polymer.

8. The coating composition according to claim 1, wherein the binder includes a non-polymeric plasticiser present at up to 50% by weight based on the total binder polymer.

9. A method for protection of a man-made structure immersed in water comprising applying the coating composition of claim 1 to said structure.

10. The method according to claim 9, wherein the structure is selected from the group consisting of a boat hull, a buoy, a drilling platform, an oil production rig, and a pipe.

* * * * *